United States Patent

Marx et al.

[11] 4,054,365
[45] Oct. 18, 1977

[54] FIBER OPTIC CABLE CONSTRUCTION

[75] Inventors: Walter H. Marx, Berkeley Heights; Stanton M. Smith, West Orange; Eugene J. Gavaletz, Toms River, all of N.J.

[73] Assignee: General Cable Corporation, Boonton, N.J.

[21] Appl. No.: 691,031

[22] Filed: May 28, 1976

[51] Int. Cl.² .................................................. G02B 5/16
[52] U.S. Cl. ............................. 350/96 B; 350/96 WG
[58] Field of Search ........................ 350/96 B, 96 WG

[56] References Cited

U.S. PATENT DOCUMENTS

| 3,887,265 | 6/1975 | Mangolis et al. | 350/96 B |
| 3,937,559 | 2/1976 | Ferrentino et al. | 350/96 B |

FOREIGN PATENT DOCUMENTS

| 2,265,108 | 10/1975 | France | 350/96 B |
| 2,523,738 | 12/1975 | Germany | 350/96 B |
| 2,429,670 | 1/1975 | Germany | 350/96 B |

*Primary Examiner*—John K. Corbin
*Assistant Examiner*—Stewart Levy
*Attorney, Agent, or Firm*—Roy C. Hopgood; John M. Calimafde; Charles W. Neill

[57] ABSTRACT

This specification describes a fiber optic cable in which the delicate glass fibers are supported by carriers which protect the fibers from stresses imposed during the manufacturing process, the installation of the cable and the environmental conditions after installation. Microbending of the fibers is eliminated by having smooth supports and by protecting the fibers from contact with any structure that will stress them. Another feature is the provision of tension elements in the carriers with neutral axes in transverse alignment with the neutral axes of the glass fibers that the carriers support.

11 Claims, 3 Drawing Figures

FIBER OPTIC CABLE CONSTRUCTION

BACKGROUND AND SUMMARY OF THE INVENTION

One of the problems in the manufacture of fiber optic cables has been to minimize or eliminate the "microbending" of glass fibers in the finished cable. Microbending is a phenomenon that occurs when radial pressure is applied to the glass surface, forcing it to conform somewhat to the surface roughness of a contacting member. These small amplitude, random bends cause the signal to attenuate. Commonly, such attenuation amounts to a few decibels per kilometer, but it can be as high as a few hundred decibels per kilometer.

Some of the common causes of microbending include tension resulting from winding the fiber or cable on a reel; tension resulting from helical stranding; bending of the cable during installation; pinching the fibers between other cable components; and differential coefficients of thermal expansion which cause tensions and/or compression with resultant radial stresses.

Most cable designs, including telephone, power, and fiber optic cables employ the concept of "stranding" or "oscillating" of individual components to allow for flexibility during manufacture and installation. When a cable is bent into an arc, the portion of the cable on one side of the neutral axis is subjected to compressive forces, and the opposite side is subjected to tensile forces, tending to cause the components to migrate from the compression side to the tensioned side.

In the case of metallic and other conventional cable components, such as wire, these forces are generally not severe enough to cause detrimental effects; namely, elongation, diameter reduction, breakage, etc. In the case of glass fibers, however, these tensile and compressive forces do cause radial pressure on the buffered fiber, resulting in microbending and increased signal attenuation. In more severe cases, fiber breakage can occur. This invention solves these problems by providing a grooved carrier for the glass fiber which is designed to absorb all the forces resulting from bending and flexing of the cable in the process of manufacture and in the finished cable. The carrier also protects the fiber optic element from crushing or pinching. When the stranded (or oscillated) cable is flexed, there is a relative movement of the carrier with respect to other cable components, but the resulting stresses are felt by the carrier; and there is no relative movement between the carrier and the fiber that is placed within the carrier groove. Therefore, no fiber stresses result. Thus the invention provides a construction in which the full benefits of stranding can be achieved without imparting mechanical stresses within the glass fiber.

Other objects, features and advantages of the invention will appear or be pointed out as the description proceeds.

BRIEF DESCRIPTION OF THE DRAWINGS

In the drawing, forming a part hereof, in which like reference characters indicate corresponding parts in all the views.

DESCRIPTION OF PREFERRED EMBODIMENT

Figure 1:
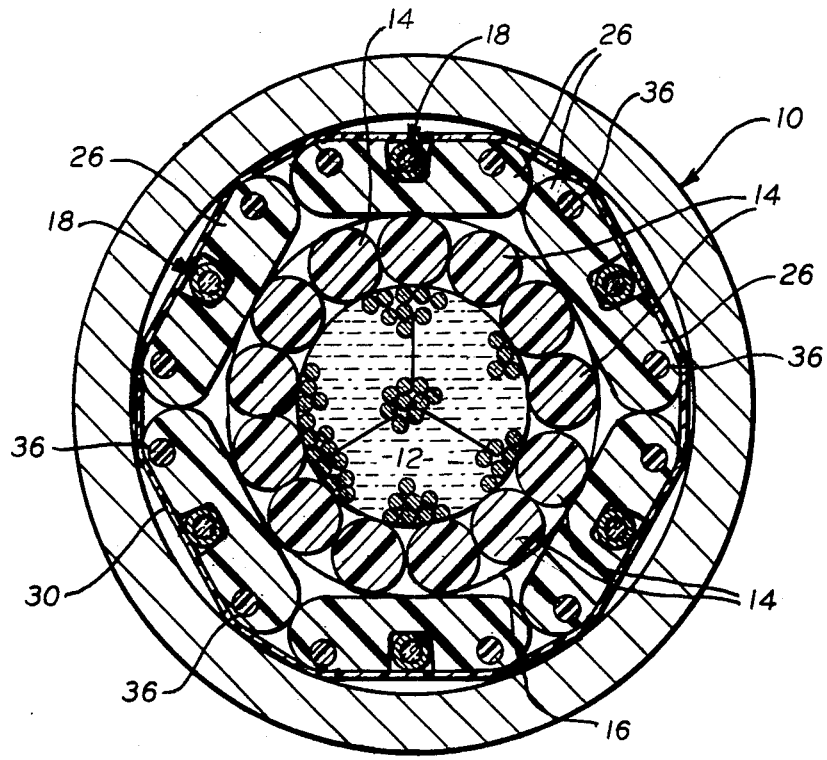
FIG. 1 is an enlarged cross-section of a fiber optic cable made in accordance with this invention.

FIG. 1 shows a cable 10 having a center section 12 containing metal conductors such as used for telephone wire. This center section, which may be of conventional construction, is surrounded by padding which is preferably composed of crushed polyethylene fillers 14 placed side-by-side around the circumference of the center section 12. A wrapping 16 holds the strands of padding 14 in place against the center section 12.

An optical fiber 18, preferably made of a glass core 20, surrounded by a cladding layer 22 (FIG. 2) is located in a groove 24 in an outside surface of a carrier 26.

There are six carriers 26 located around the circumference of the padding 14. The inner surfaces of the carriers 26 contact with the padding 14, and the individual carriers contact with adjacent carriers, as illustrated in FIG. 1.

The carriers 26 are held in contact with the padding 14 and with each other by a binder, preferably Nylon (DuPont T.M.) and a tape 30, such as used for electrical cables and commonly made of Mylar (DuPont T.M.).

A metal sheath 32, preferably made of aluminum, is wrapped around the outside of the carriers 26. This sheath 32 is preferably a longitudinally folded tape, and it can be corrugated if the cable is large and corrugating is necessary for greater flexibility.

Figure 2:
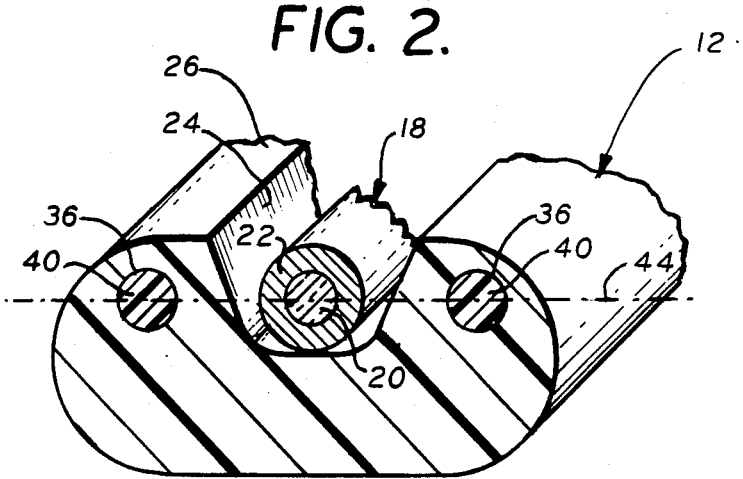
FIG. 2 is a greatly enlarged fragmentary view, partly in section, illustrating the location of the neutral axis of the fiber optic element in the same transverse plane as the neutral axes of tension elements of the carrier.

FIG. 2 shows one of the carriers 26 on an enlarged scale. The groove 24 has a depth slightly greater than the diameter of the cladding optic fiber 18. The bottom of the groove 24 is preferably narrower than the top of the groove, and the sides of the groove diverge from one another as they extend upwardly. This divergence is sufficient to insure a greater width than the optic fiber at the distance above the bottom of the groove equal to the radius of the fiber and at which the fiber has its maximum transverse dimension.

The optic fiber 18 is placed in the groove 24 at a center location and remains at this location, because the fiber is not subjected to any stresses which cause movement with respect to the carrier 26.

Each carrier is preferably constructed with two tension elements 36 which take the stress when there is any force tending to elongate the carrier 26. These tension elements 36 are somewhat stiffer than the rest of the carrier 26, so that when bending forces are applied to the carrier, it bends about the neutral axes of the fibers, these axes being designated in FIG. 2 by the reference character 40. In order to have the tension elements 36 relieve the optic fiber 18 of any longitudinal stresses when the carrier is bent, the neutral axes of the tension elements 36 are located in transverse alignment with the neutral axis of the optic fiber 18, as indicated by the line 44 in FIG. 2.

The carriers may be "stranded" or "cabled" by having them follow helical paths as they extend lengthwise along the cable. It will be understood that the strands of padding 14 may also be cabled to follow helical paths as they extend lengthwise of the cable.

Figure 3:
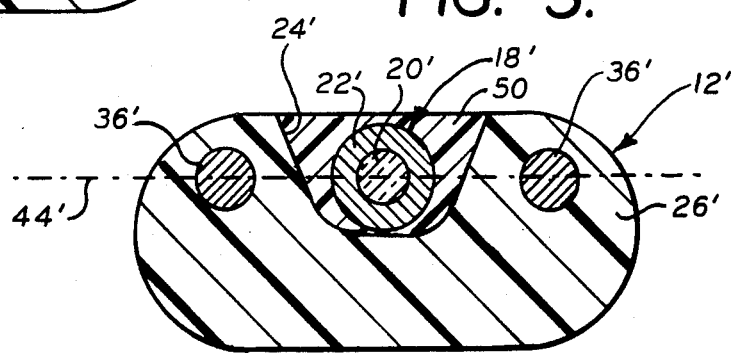
FIG. 3 is a sectional view through a construction similar to that of FIG. 2, except that the tension elements of the carrier are made of metal instead of plastic.

FIG. 3 shows a construction, similar to FIG. 2, with corresponding parts indicated in FIG. 3 by the same reference character as FIG. 2 but with a prime appended. The only difference in the construction of FIG. 3 is that tensioned elements 36' are made of metal, whereas the tension elements 36 of FIG. 2 are preferably made of plastic. A single material carrier, having a neutral axis 44, is a third alternative.

The carriers shown in FIGS. 2 and 3 are somewhat wider than those shown in FIG. 1. and the transverse width of the carrier is chosen so as to permit the carriers to contact with one another around the circumference of the cable, as shown in FIG. 1. For example, if eight optic fibers are to be used instead of six, as in FIG. 1, then the carriers are constructed so as to occupy 45° of arc instead of 60° as in FIG. 1.

It is a feature of the invention that each of the carriers 12 is made with the bottom and sides of the grooves 24 as smooth as possible to eliminate any microbending of the optic fiber; and the carriers are made stiff enough so that when bent into helical contours in a finished cable they assume a uniform radius of curvature along their length and thus provide uniform curvature for the optic fibers.

FIG. 3 shows the groove 24' with a filler 50, preferably made of soft plastic material, which provides a hydraulic cushion for the optical fiber 18'. The drawing shows the optic fibers 18 to be buffered, but the invention lends itself also to the use of unclad optic fibers.

Where the number of optic fibers becomes too large to be accommodated by a single layer of carriers, additional layers of carriers outside of the first layer can be used with corresponding increase in the diameter of the cable.

The preferred embodiment of the invention has been illustrated and described, but changes and modifications can be made and some features can be used in different combinations without departing from the invention as defined in the claims.

What is claimed is:

1. A fiber optic cable including in combination a central core subject to tension applied to the cable, an outer jacket, a transmission medium comprising an optic fiber, and a carrier extending lengthwise of the cable and located within the jacket and surrounding the core and having a preformed groove therein of greater cross-section than the fiber, said groove opening through a top surface of the carrier and extending downward from said top surface of the carrier, and in which the optic fiber is supported, said carrier protecting the optic fiber from stresses imposed upon the cable, the surface of the groove that contacts with the optic fiber, being smooth so as to support the optic fiber free of microbending of the optic fiber, the optic fiber having a neutral axis along which the fiber bends where it extends in a changing direction, and the groove being shaped and so located in the carrier that the neutral axis of the optic fiber substantially coincides with a neutral axis along which the carrier bends when it changes its direction of longitudinal extent.

2. The fiber optic cable described in claim 1 characterized by two tension elements constituting part of the carrier and each having a neutral axis along which that tension element bends, the tension elements being located on opposite sides of the groove and at such locations that a line connecting the neutral axes of the tension elements at any location along the length of the cable substantially intersects the neutral axis of the optic fiber.

3. The fiber optic cable described in claim 1 characterized by the depth of the groove being greater than the diameter of the optic fiber, the sides of the groove diverging from one another as they extend upward from the bottom of the groove, said sides of the groove at all levels being spaced from one another by a distance greater than the width of the optic fiber at the same level.

4. The fiber optic cable described in claim 1 characterized by the groove being at the top of the carrier and intermediate the sides thereof, and the cross-section of the carrier being of substantially greater dimension from one side to the other than from the top to the bottom of the carrier.

5. The fiber optic cable described in claim 1 characterized by a filler in the groove extending between the optical fiber and walls of the groove and providing in effect a hydraulic cushion for the optical fiber.

6. The fiber optic cable described in claim 1 characterized by the cable including a plurality of discrete carriers, each of which has a groove in which an optic fiber is carried, the carriers being angularly spaced around a center axis of the cable, the independent carriers and the optic fibers supported by the carriers being cabled so that they follow helical paths along the length of the cable.

7. The fiber optic cable described in claim 6 characterized by each of the carriers being a separate entity and made of solid plastic material with sufficient flexibility to bend into a helical course for a cabled construction.

8. The fiber optic cable described in claim 6 characterized by each carrier having a foamed plastic structure on which the optic fiber is supported.

9. The fiber optic cable described in claim 1 characterized by the cable including an electrical transmission medium comprising metal wire at a center region of the cable, and a plurality of discrete carriers at different angular locations from one another around the outside of the center region.

10. The fiber optic cable described in claim 9 characterized by the cable having a group of wires at the center region, soft filler material in the cable around the group of wires and between the carriers and said group of wires, a binder holding the carriers against the soft filler material, and an outer sheath surrounding the binder.

11. The fiber optic cable described in claim 10 characterized by the binder being a plastic tape wound around the carriers.

* * * * *